United States Patent
Konda et al.

(10) Patent No.: US 9,720,733 B1
(45) Date of Patent: Aug. 1, 2017

(54) METHODS AND SYSTEMS FOR CONTROL BLOCK ROUTING

(71) Applicant: QLOGIC Corporation, Aliso Viejo, CA (US)

(72) Inventors: Dharma R. Konda, Aliso Viejo, CA (US); Rajendra R. Gandhi, Laguna Niguel, CA (US); Ben K. Hui, Irvine, CA (US); Bruce A. Klemin, Rocklin, CA (US)

(73) Assignee: QLOGIC Corporation, Aliso Viejo, CA (US)

( * ) Notice: Subject to any disclaimer, the term of this patent is extended or adjusted under 35 U.S.C. 154(b) by 0 days.

(21) Appl. No.: 14/698,581

(22) Filed: Apr. 28, 2015

(51) Int. Cl.
| | |
|---|---|
| *G06F 9/46* | (2006.01) |
| *G06F 3/00* | (2006.01) |
| *G06F 13/28* | (2006.01) |
| *G06F 9/50* | (2006.01) |
| *G06F 9/48* | (2006.01) |
| *G06F 13/10* | (2006.01) |
| *G06F 13/20* | (2006.01) |

(52) U.S. Cl.
CPC .............. *G06F 9/50* (2013.01); *G06F 9/4881* (2013.01); *G06F 9/5005* (2013.01); *G06F 9/5011* (2013.01); *G06F 9/5016* (2013.01); *G06F 9/5022* (2013.01); *G06F 9/5027* (2013.01); *G06F 9/5033* (2013.01); *G06F 9/5044* (2013.01); *G06F 13/10* (2013.01); *G06F 13/20* (2013.01); *G06F 13/28* (2013.01)

(58) Field of Classification Search
None
See application file for complete search history.

(56) References Cited

U.S. PATENT DOCUMENTS

| | | | | | |
|---|---|---|---|---|---|
| 6,163,793 | A * | 12/2000 | Gerber | ................... | G06F 9/3879 |
| | | | | | 712/E9.068 |
| 7,487,319 | B2 * | 2/2009 | Benhase | ................ | G06F 9/5016 |
| | | | | | 707/999.202 |
| 8,250,252 | B1 * | 8/2012 | Konda | ..................... | G06F 13/28 |
| | | | | | 710/22 |
| 8,495,259 | B2 * | 7/2013 | Bakke | ..................... | G06F 3/061 |
| | | | | | 710/22 |
| 8,516,164 | B2 * | 8/2013 | Bakke | ................... | G06F 3/0611 |
| | | | | | 710/22 |
| 8,677,044 | B1 * | 3/2014 | Gandhi | .................. | G06F 13/28 |
| | | | | | 710/22 |

(Continued)

*Primary Examiner* — Charles Swift
(74) *Attorney, Agent, or Firm* — Klein, O'Neill & Singh, LLP

(57) ABSTRACT

Methods and systems for routing control blocks is provided. One method includes receiving a control block from a computing device at an adapter having a plurality of hardware engines for processing control blocks, where the control blocks are to read data, write data, obtain status for an input/output request and perform a management task; evaluating the control block by the adapter to determine that the control block is a continuation control block for data transfer using more than one control block; is a direct route control block for a specific hardware engine; or is for a management task; routing the control block to a same hardware engine when the control block is a continuation control block; and routing the control block to a master hardware engine from among the plurality of hardware engines, when the control block is for the management task.

21 Claims, 8 Drawing Sheets

(56) References Cited

U.S. PATENT DOCUMENTS

| | | | | |
|---|---|---|---|---|
| 2004/0028053 | A1* | 2/2004 | Mes | G06F 13/30 |
| | | | | 370/395.7 |
| 2009/0172203 | A1* | 7/2009 | Casper | G06F 13/126 |
| | | | | 710/5 |
| 2011/0004732 | A1* | 1/2011 | Krakirian | G06F 12/0817 |
| | | | | 711/147 |
| 2011/0154334 | A1* | 6/2011 | Beale | G06F 9/5027 |
| | | | | 718/100 |
| 2012/0017217 | A1* | 1/2012 | Umezawa | G06F 9/526 |
| | | | | 718/102 |
| 2012/0240128 | A1* | 9/2012 | Alofs | G06F 11/349 |
| | | | | 718/104 |
| 2012/0303855 | A1* | 11/2012 | Bakke | G06F 13/28 |
| | | | | 710/308 |
| 2012/0303922 | A1* | 11/2012 | Bakke | G06F 3/0617 |
| | | | | 711/170 |
| 2013/0132698 | A1* | 5/2013 | Huang | G06F 3/0611 |
| | | | | 711/170 |
| 2014/0101671 | A1* | 4/2014 | Kobayashi | G06F 9/505 |
| | | | | 718/105 |
| 2015/0040135 | A1* | 2/2015 | Benhase | G06F 9/5016 |
| | | | | 718/104 |
| 2016/0098296 | A1* | 4/2016 | Ash | G06F 9/5005 |
| | | | | 718/104 |

* cited by examiner

METHODS AND SYSTEMS FOR CONTROL BLOCK ROUTING

TECHNICAL FIELD

The present disclosure relates to computing devices and more particularly, to routing control blocks by a device coupled to a computing device.

BACKGROUND

Computing systems are commonly used today. A computing system often communicates with a peripheral device, for performing certain functions, for example, an adapter reading and writing information. To process an input/output (I/O) request, an adapter may have to process I/O control blocks (IOCBs) that are received from the computing device. Continuous efforts are being made to improve IOCB routing and processing.

SUMMARY

The various present aspects have several features, no single one of which is solely responsible for their desirable attributes. Without limiting the scope of the present aspects as expressed by the claims that follow, their more prominent features now will be discussed briefly. After considering this discussion, and particularly after reading the section entitled "Detailed Description," one will understand how the features of the present aspects provide the advantages described herein.

In one aspect, a machine implemented method is provided. The method includes receiving a control block from a computing device at an adapter having a plurality of hardware engines for processing control blocks, where the control blocks are to read data, write data, obtain status for an input/output request and perform a management task; evaluating the control block by the adapter to determine that the control block is a continuation control block for data transfer using more than one control block; is a direct route control block for a specific hardware engine; or is for a management task; routing the control block to a same hardware engine when the control block is a continuation control block; and routing the control block to a master hardware engine from among the plurality of hardware engines, when the control block is for the management task.

In another aspect, a non-transitory, machine readable storage medium with machine executable code having stored thereon instructions for performing a method is provided. The machine executable code which when executed by at least one machine, causes the machine to: receive a control block from a computing device at an adapter having a plurality of hardware engines for processing control blocks, where the control blocks are to read data, write data, obtain status for an input/output request and perform a management task; evaluate the control block by the adapter to determine that the control block is a continuation control block for data transfer using more than one control block; is a direct route control block for a specific hardware engine; or is for a management task; route the control block to a same hardware engine when the control block is a continuation control block; and route the control block to a master hardware engine from among the plurality of hardware engines, when the control block is for the management task.

In yet another aspect, a device for processing input/output requests coupled to a computing device is provided. The device includes a plurality of hardware engines for processing control blocks, where the control blocks are to read data, write data, obtain status for an input/output request and perform a management task; and a direct memory access (DMA) request logic. The DMA request logic executes instructions to: receive a control block from the computing device; evaluate the control block to determine that the control block is a continuation control block for data transfer using more than one control block; is a direct route control block for a specific hardware engine; or is for a management task; route the control block to a same hardware engine when the control block is a continuation control block; and route the control block to a master hardware engine from among the plurality of hardware engines, when the control block is for the management task.

This brief summary has been provided so that the nature of the disclosure may be understood quickly. A more complete understanding of the disclosure can be obtained by reference to the following detailed description of the aspects thereof concerning the attached drawings.

BRIEF DESCRIPTION OF THE DRAWINGS

The various aspects relating to facilitating communication between devices in a network now will be discussed in detail with an emphasis on highlighting the advantageous features. These novel and non-obvious aspects are shown in the accompanying drawings, which are for illustrative purposes only. These drawings include the following figures, in which like numerals indicate like parts.

DETAILED DESCRIPTION

Figure 1A:
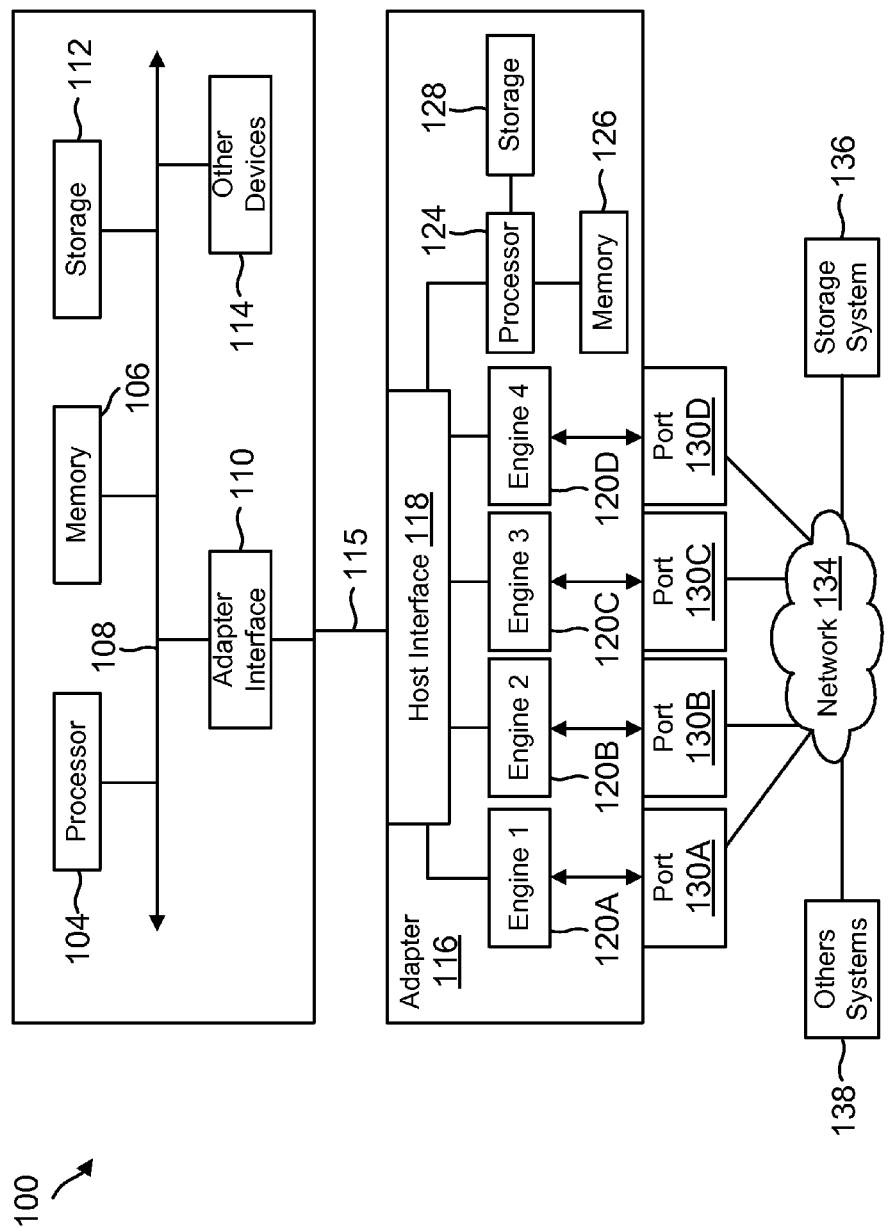
FIG. 1A is a functional block diagram of a system, used according to one aspect of the present disclosure.

The following detailed description describes the various present aspects with reference to the drawings. In the drawings, reference numbers label elements of the present aspects. These reference numbers are reproduced below in connection with the discussion of the corresponding drawing features.

As a preliminary note, any of the aspects described with reference to the figures may be implemented using software, firmware, hardware (e.g., fixed logic circuitry), manual processing, or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.).

The various aspects disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

In one aspect, methods and systems for routing input/output control blocks (IOCBs) are provided. A control block from a computing device is received at an adapter having a plurality of hardware engines for processing control blocks. The IOCBs may be used to read data, write data, obtain status for an input/output request and perform a management task. The adapter evaluates the IOCB to determine if it is a continuation control block for data transfer using more than one IOCB; is a direct route IOCB for a specific hardware engine; or is for a management task. The IOCB is routed to a same hardware engine when it is a continuation control block; or routed to a master hardware engine from among the plurality of hardware engines, when the IOCB is for the management task.

System:

FIG. 1A is a block diagram of a system 100 configured for use with the present various aspects of the present disclosure. The system 100 may include one or more computing devices/system 102 (may also be referred to as "host system 102") coupled to another device via a link 115, for example, an adapter 116 that interfaces with a network 134. The network 134 may include, for example, additional computing systems 138, storage system 136 and other devices. It is noteworthy that although the description below is based on the interaction between adapter 116 and host system 102, the various aspects disclosed herein are not limited to any particular adapter type or device type.

The computing system 102 may also include one or more processors 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The processor 104 executes computer-executable process steps and interfaces with an interconnect (or computer bus) 108. The computer bus 108 may be, for example, a system bus, a Peripheral Component Interconnect (PCI) bus (or PCI-Express (PCIe) bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

An adapter interface 110 facilitates the ability of the computing system 102 to interface with the adapter 116 via the link 115. Link 115 may be an interconnect system, for example, a PCIe bus. The computing system 102 also includes other devices and interfaces 114, which may include a display device interface, a keyboard interface, a pointing device interface, etc. Details regarding the other devices 114 are not germane to the aspects disclosed herein.

The computing system 102 may further include a storage device 112, which may be for example a hard disk, a CD-ROM, a non-volatile memory device (flash or memory stick) or any other mass storage device. Storage 112 may store operating system program files, application program files, and other files. Some of these files are stored on storage 112 using an installation program. For example, the processor 104 may execute computer-executable process steps of an installation program so that the processor 104 can properly execute the application program.

Memory 106 also interfaces to the computer bus 108 to provide the processor 104 with access to memory storage. Memory 106 may include random access main memory (RAM). When executing stored computer-executable process steps from storage 112, the processor 104 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1A, link 115 and the adapter interface 110 couple the adapter 116 to the computing system 102. The adapter 116 may be configured to handle both network and storage traffic. Various network and storage protocols may be used to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support higher data transfer rates (for example, 10G (Gigabit) or higher). The descriptions of the various aspects described herein are based on using Ethernet (which includes 100 Base-T and/or Gigabit Ethernet) as the network protocol. However, the adaptive aspects disclosed herein are not limited to any particular protocol, as long as the functional goals are met by an existing or new network protocol.

One common storage technology used to access storage systems/devices in a storage area network (SAN) is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via adapter (also known as host bus adapters)) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

Fibre Channel over Ethernet (FCOE) has been developed to handle both Ethernet and Fibre Channel traffic in a SAN. This functionality would allow Fibre Channel to leverage 10 Gigabit Ethernet networks while preserving the Fibre Channel protocol. The adapter 116 shown in FIG. 1A may be configured to operate as an FCOE adapter and may be referred to as FCOE adapter 116. The illustrated adapter 116, however, does not limit the scope of the present aspects. The present aspects may be practiced with adapters having different configurations.

Referring back to FIG. 1A, adapter 116 interfaces with the computing system 102 via the link 115 and a host interface 118. In one aspect, the host interface 118 may be a PCI Express interface having logic/circuitry for sending and receiving PCI-Express packets. Details regarding host interface 118 are provided below. Host interface 118 uses direct memory access (DMA) to send and receive information from processor 104 via link 115. A plurality of DMA channels as described below may be used for managing access to link 115. The DMA channels are typically used to move control structures such as IOCBs, input/output status blocks (IOSBs) and data between host system memory 106 and the adapter memory 126. An IOCB (and IOSB) is a structure that is used for communication between host 102 processor/components and adapter 116 components, as described below in detail.

The adapter 116 includes a processor 124 that executes firmware instructions out of a memory 126 to control overall adapter operations. The adapter 116 may also include storage 128, which may be for example non-volatile memory, such as flash memory, or any other device. The storage 128 may store executable instructions and operating parameters that can be used for controlling overall adapter operations.

As an example, adapter 116 includes a plurality of engines (may be called engine cores, hardware engines or hardware cores) 120A-120D that interface with ports 130A-130D for sending and receiving packets. Engines 120A-120D include hardware to process certain protocol specific packets, for example, Fibre Channel packets. In such an instance, an engine may be referred to as a "FC core". Ports 130A-130D include logic and circuitry to connect to network 134. Details regarding how IOCBs are distributed among engines 120A-120D are provided below.

Figure 1B:
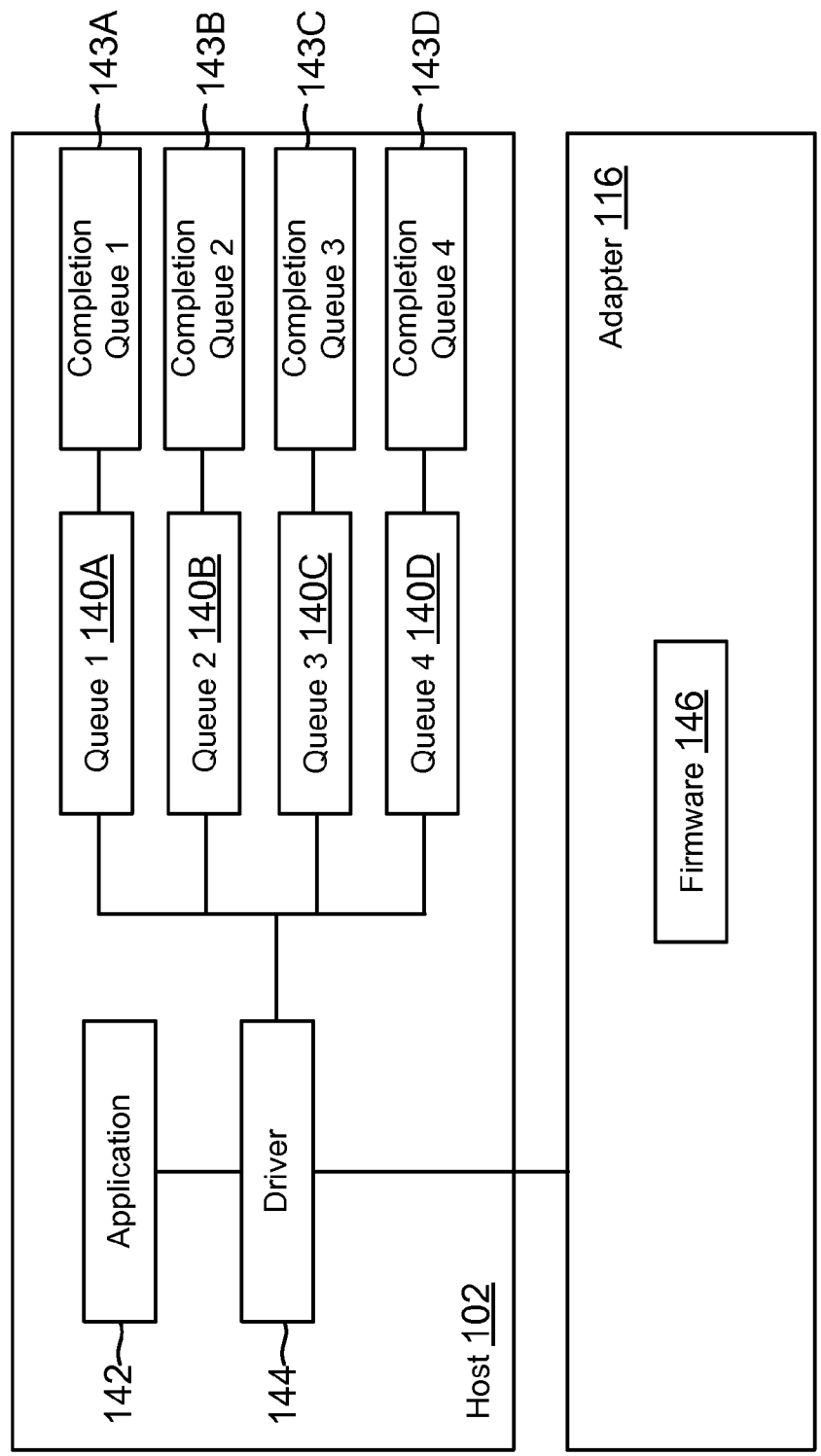
FIG. 1B shows a block diagram of a generic architecture used by the system of FIG. 1A, according to one aspect of the present disclosure.

FIG. 1B shows an example of a generic software architecture used by system 100. Processor 104 executes an operating system (not shown) for controlling the overall operations of computing system 102. The operating system may be Windows based, Linux operating system, Solaris, or any other operating system type (without derogation of any third-party trademark rights). The various aspects disclosed herein, of course are not limited to any particular operating system type.

An application 142 may be executed by processor 104 for performing certain functions. For example, application 142 may be an email program, a database application or any other application type. Application 142 may send a command to a driver 144 for performing an operation, for example, reading and/or writing data (input/output (I/O)) at another storage device. The driver 144 processes the request and uses an IOCB to communicate with firmware 146 executed by processor 124 of adapter 116. As an example, there may be a plurality of IOCB types, for example, a generic IOCB for reading or writing data, a continuation IOCB that is related to a previous IOCB for a same data transfer request, and a management IOCB that is used for obtaining status. A completion or communication from adapter 116 may be referred to as I/O status block or "IOSB". An appropriate component of adapter 116 then processes the request.

As an example, host 102 maintains a plurality of queues 140A-140D at host memory 106. The queues are associated with engines 120A-120D. An IOCB may be placed at one of the queues by driver 144 for processing. The adapter 116 obtains the IOCB using DMA via link 115 and processes the IOCB. After the IOCB is processed, a completion is posted at one of the completion queues 143A-143D corresponding to each queue 140A-140N. Details regarding IOCB routing and how they are distributed among the various engines 120A-120D are provided below.

Figure 1C:
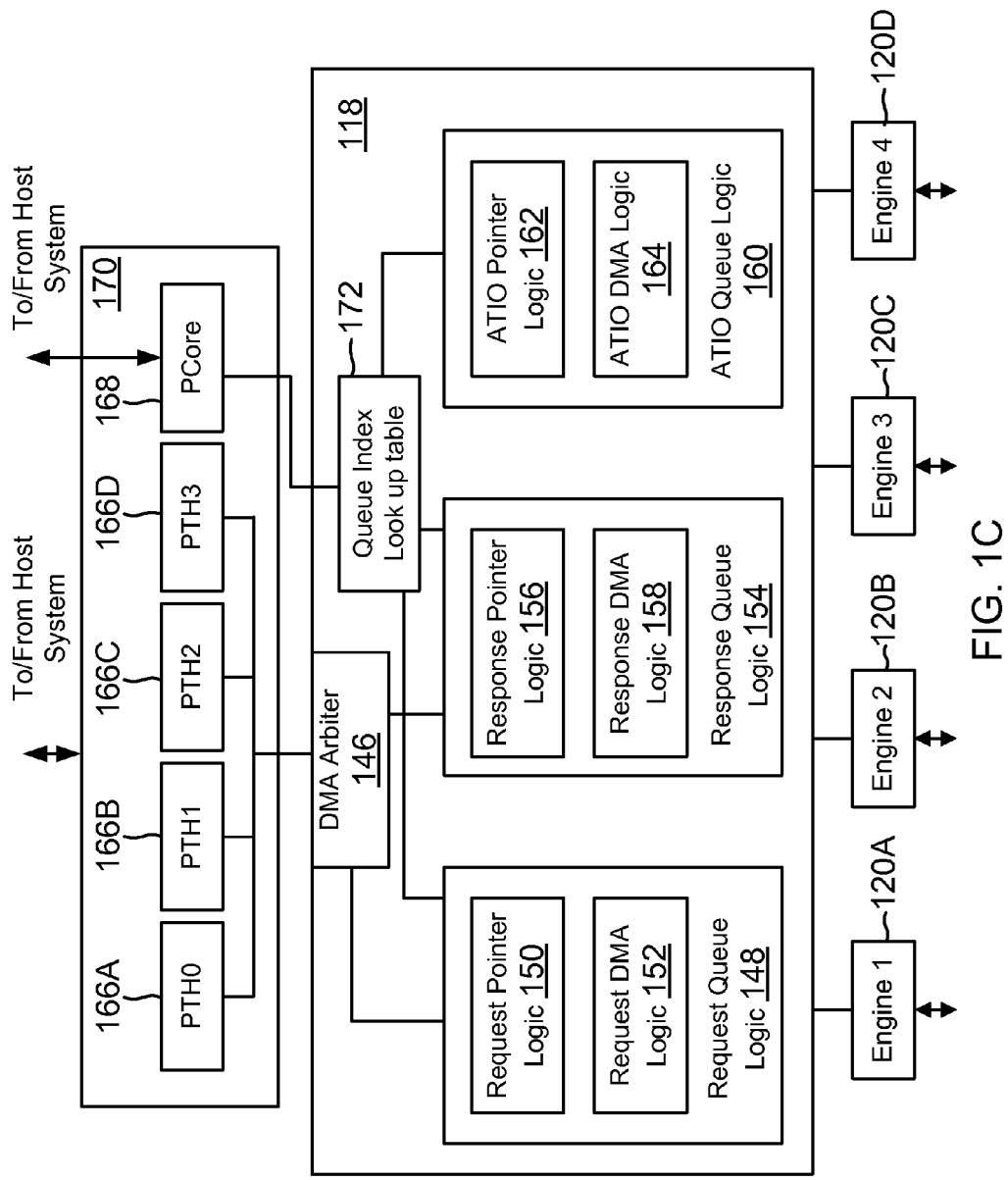
FIG. 1C shows an example of a host system interface used in an adapter, according to one aspect of the present disclosure.

FIG. 1C shows an example of host interface 118, according to one aspect of the present disclosure. The host interface 118 interfaces with a PCI-Express layer 170. The PCI-Express layer includes a plurality of PCI-Express transaction handlers (166A-166D) (shown as PTH0-PTH3) and a PCI-core (Pcore) module 170. The PTH 166A-166D are used to interface with the host system for DMA based transactions. Pcore 168 is used for PCI-Express based address translations, the details of which are not germane to the adaptive aspects described herein. Each PTH module 166A-166D receive IOCBs from the host system 102 and then the IOCBs are delivered to engines 120A-120D, as described below in detail.

Host interface 118 includes request queue logic 148, response queue logic 154 and accept target I/O control block (ATIO) logic 160, according to one aspect of the present disclosure. The request queue logic 148 includes a request pointer logic 150 that may have a plurality of queues, for example, 256 queues to store queue images and pointer pairs, i.e. an In-pointer and an out-pointer. Each pointer pair is associated with a queue, for example, 140A-140D shown in FIG. 1B and described above.

Figure 1D:
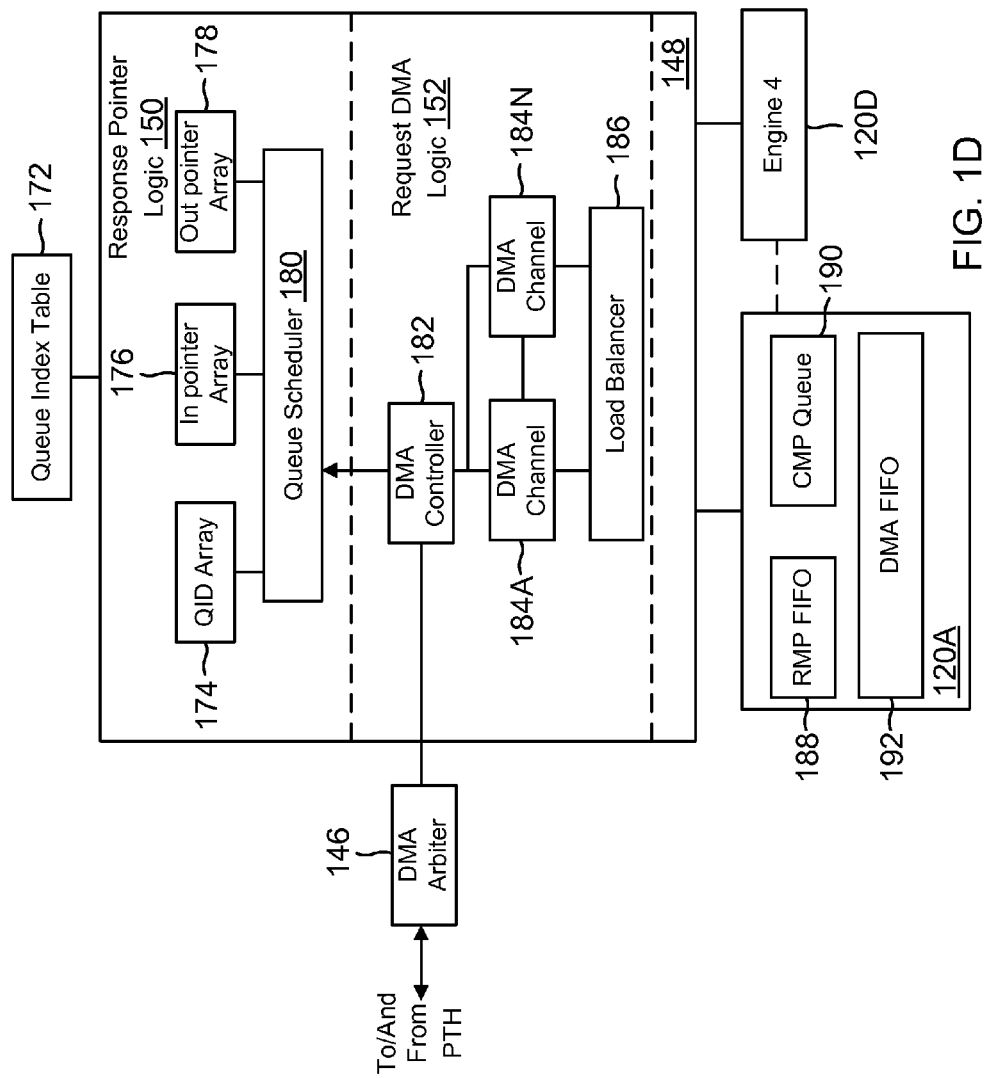
FIG. 1D shows an example of a request queue logic used by the host system interface, according to one aspect of the present disclosure.

The request queue logic 148 further includes request DMA logic 152 that distributes IOCBs to engines 120A-120D. In one aspect, command and continuation IOCBs may be passed to the same engine, as described below in detail. In one aspect, an entry count field in an IOCB is used to differentiate between a command and a continuation IOCB. If an entry count is 1, then it is assumed to be a command type IOCB and is associated with a single data I/O. If the entry count is more than 1, then it is assumed to be a continuation IOCB that may involve more than one I/O data transfer. Details regarding request queue logic 148 are shown in FIG. 1D and described below in detail.

Response queue logic 154 includes a response pointer logic 156 that operates similar to request pointer logic 150 and response DMA logic 158. The response DMA logic 158 fetches IOSBs from the engines 120A-120D and then passes them to the PTH 166A-166D using a queue image and pointer pair information that is maintained by the response pointer logic 156. In one aspect, response DMA logic 158 passes a continuation IOSB from a same engine to the host memory without breaking its continuity. Just like IOCB, an entry count field in the IOSB may be used to distinguish between a command and continuation IOSB.

The ATIO pointer logic 162 is used when adapter 116 is configured in a target mode. ATIO pointer logic 162 operates similar to request pointer logic 150 and the ATIO DMA logic 164 is similar to the request DMA logic 152, described above in detail. The ATIO pointer logic 162 maintains in-out pointers and queue images. The ATIO DMA logic 164 passes ATIO continuation IOCBs to the host memory without breaking continuity.

Host interface module 118 further includes a DMA arbiter module 146. The DMA arbiter module 146 receives requests from the request queue logic 148, the response queue logic 154 and the ATIO queue logic 160 so that an IOSB can be sent to the PTH modules. One of the requests is selected and then processed. The DMA arbiter 146 also receives requests from PTH modules for sending IOCBs to the engines 120A-120D.

In one aspect, host interface module 118 also includes a queue index lookup table 172. The queue index table 172 is used to determine a queue number for one of the queues 140A-140D. In one aspect, the host system 102 provides a physical function (PF) number, a virtual function number and a page number when it updates a pointer array (for example, 176, FIG. 1D). This information is used to obtain a queue number that provides an index into an in-pointer and out-pointer array, described below. It is noteworthy that that there may be other addressing schemes that may be used to obtain the address of queues 140A-140D and the adaptive aspects described herein are FIG. 1D shows a detailed block diagram of the request queue logic 148, according to one aspect of the present disclosure. The request DMA logic 152 includes a DMA controller 182 that manages DMA transfers through a plurality of DMA channels 184A-184N.

The request pointer logic 150 includes an in-pointer array 176 and an out-pointer array 178. The image array (shown as QID array) 174 may be used to store information regarding host request queues. The in-pointer and out-pointer array may be configured to hold an index value, for example, a 16-bit value. The difference in the index value pair provides an indication of IOCBS that are ready at host memory queues and can be transferred to adapter 116. The in-pointer array 176 is written by the host processor 104 and read by adapter 116, while the out-pointer array 178 is written by the adapter 116 and read by the host system 102.

In one aspect, a queue scheduler 180 is provided that operates in conjunction with the request DMA logic 152. The queue scheduler 180 arbitrates between valid host request queues and assigns it to an available DMA channel 184A-184N. The queue scheduler 180 first checks to see if a queue is available to process IOCBs. It checks for a next DMA channel that may be available to transfer IOCBs. The queue scheduler 180 assigns the queue number to the DMA channel that is then used to transfer the IOCBs.

In one aspect, a load balancer 186 is provided for routing IOCBs to the engines 120A-120D. The load balancer 186 determines an IOCB priority and based on that the IOCB is routed. For example, a continuous IOCB is routed to the same engine that processed a previous IOCB of the same chain. A task management IOCB is routed to an engine core that is designated as a master engine. As an example, all the engines 120A-120D may have an identifier and the lowest one may operate as a master. Details of IOCB routing by the load balancer 186 are provided below.

FIG. 1D also shows certain components of the engines 120A-120D. The data received from the DMA channel is stored at the DMA FIFO 192. The engine core (not shown) updates a memory pointer at FIFO 188 which indicates a location at the adapter memory where the IOCB is moved from DMA FIFO 192. After the IOCB is moved to the adapter memory 126, a completion queue 190 at the adapter is updated. The completion queue 190 is read by processor 124 that updates the completion queue 143A-143D at the host memory. The IOCB is then processed by the adapter firmware.

Figure 2A:
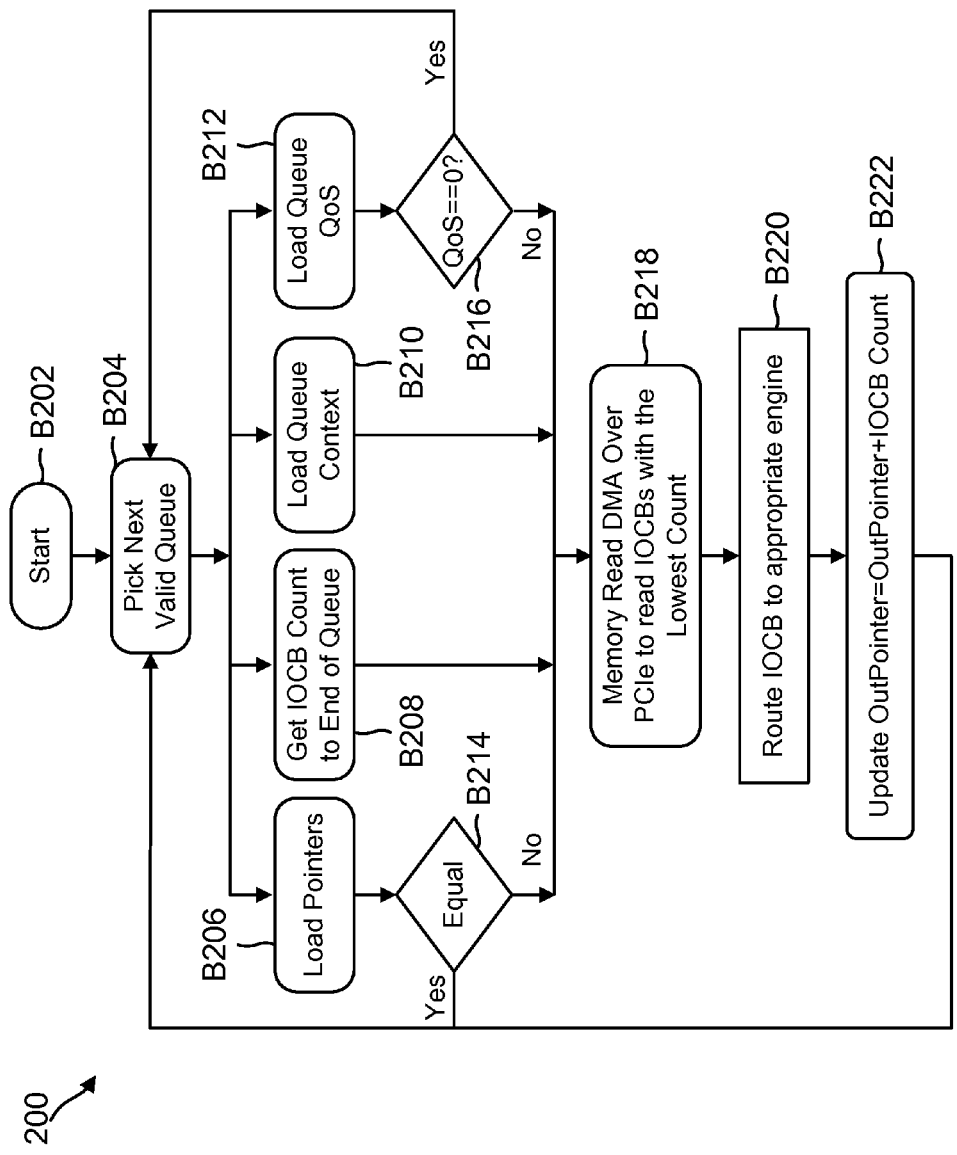
FIG. 2A shows the overall process for handling control blocks by a device, according to one aspect of the present disclosure.

Process Flows:

FIG. 2A shows a process 200 for processing IOCBs, according to one aspect of the present disclosure. The process begins in block B202, when host system 102 and adapter 116 are initialized and are operational. In block B204, adapter 116 checks to see if there is a valid queue for processing. When the host system 102 updates a queue in-pointer at the in-pointer array 176, then the queue is ready to be serviced.

In block B206, the in-pointer and out-pointer values for the queue are loaded. The IOCB count from the end of the host queue is obtained in block B208. The queue context, for example, the PCI address and any related information, including queue depth i.e. size is loaded in block B210. A quality of service (QOS) value assigned to the queue is loaded in block B212. The QOS value is used to throttle bandwidth for different queues so that no one queue unfairly uses the available bandwidth.

In block B214, the process determines if the in and out pointer values are equal. If yes, the process waits, otherwise, the process moves to block B218. Similarly, in block B216, the process determines if the QOS value for the queue is zero. If yes, the process waits, otherwise, the process moves to block B218 when the IOCB is DMAed via a DMA channel. In one aspect, the IOCB with the lowest In/Out pointer difference, QOS count or IOCB count at the end of the queue depth is selected for processing. Thereafter, in block B220, the IOCB is routed to the appropriate engine 120A-120D. Details regarding block B220 are provided below with respect to FIGS. 3A-3B. Once the IOCB is routed, the out-pointer value for the queue is updated in block B22 and the process moves on to select the next IOCB.

Figure 2B:
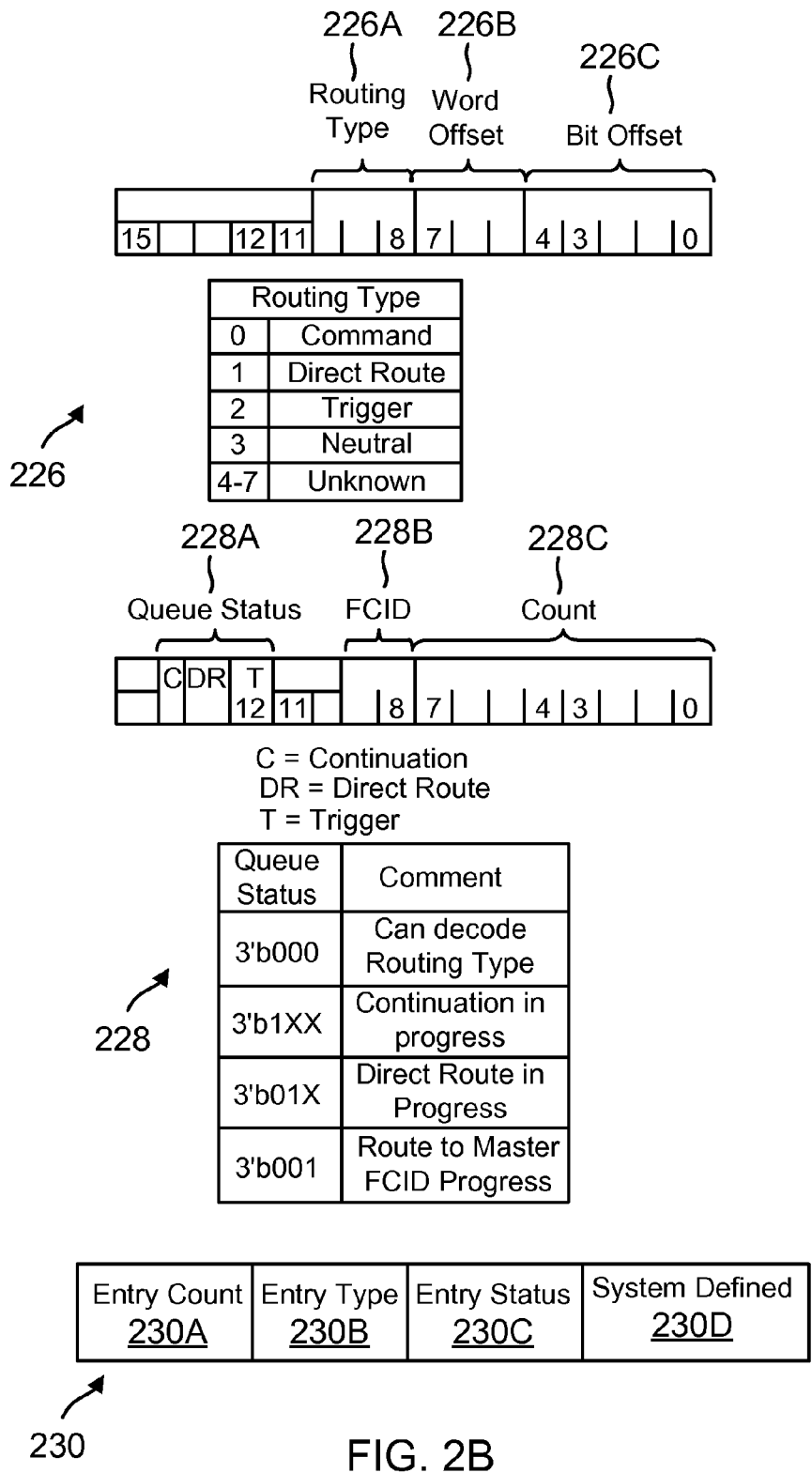
FIG. 2B shows various data structure and common control block fields, used according to one aspect of the present disclosure.

Before describing the details of block B220, the following provides a description of the various data structures and certain IOCB fields used by the adaptive aspects of the present disclosure. FIG. 2B shows an example of the data structures that are used by adapter 116 in general and request DMA logic 152 in particular, for routing IOCBs and an example of a common fields in IOCBs.

As described above, IOCB is a structure used for communication between host 102A and adapter 116. In one aspect, there may be various type of IOCBs, for example, command type IOCBs that are used to issue a SCSI command with a command descriptor block (CDB). An IOCB may be a continuation type IOCB that provides data segments for Command type IOCBs. The continuation type IOCB may support a plurality of data segments. A task management type IOCB provides an interface to submit a task management function to target devices, for example, adapter 116. A status type IOCB (i.e. an IOSB) provides a command completion status. An "abort type" IOCB allows the driver 144 to abort a specific I/O request. It is noteworthy that the adaptive aspects of the present disclosure are not limited to any specific IOCB type.

Regardless of the IOCB type, each IOCB includes certain common fields, for example, an entry count 230A, an entry type 230B, an entry status 230C and any system defined fields 230D. The entry count 230A includes a number of IOCBs in a multiple IOCB command. When an IOCB does not require any continuation, the field may be "01h". When the IOCB has more than one continuation IOCB, then the entry count may be, for example, "03h", for two continuation type IOCBs. The entry type 230B includes a type code for the IOCB type. This code is used by the DMA logic 152 to look-up a routing type, as described below in detail. The entry status field 230C is used to report any errors. When the driver 144 creates an IOCB, this field is set to zero. Adapter 116 firmware may report errors using this field. The system defined field 230D may be used by driver 144. If an IOCB is generated by the adapter 116, then this field typically includes zeroes.

In one aspect of the present disclosure, adapter 116 maintains a first data structure at a current routing type register 226 to look up a routing type and an engine 120A-120D identifier for routing an IOCB. Register 226 is accessible to the DMA request logic 152 in general and the load balancer 186 in particular that distributes the IOCB s among the different engines 120A-120D. The first data structure at register 226 stores a routing type field 226A, a word offset value 226B and a bit offset value 226C. The routing type field 226A identifies the routing type for an IOCB. The word offset value 226B and the bit offset value 226C may be used to determine an engine identifier in an IOCB, as described below in detail.

As an example, there may be a plurality of routing types, for example, a "Command" routing type, a "Direct Route" routing type, a "trigger" (or management) routing type and a "neutral" routing type. The command routing type is used to route a command and/or a continuation IOCB, as described below. The direct route routing type is used for directly routing an IOCB to a specific engine. The management or trigger type routing type involves sending a task management IOCB to an engine that is configured to be a master engine. As an example, the lowest engine identifier value may indicate a master engine from among the plurality of engines 120A-120D.

In one aspect, the adapter 116 also maintains a second data structure at a current queue routing status register 228 to track routing status of IOCBs. The second data structure at the status register 228 includes a queue status 228A, an engine identifier 228B and a count value 228C. The queue status 228A may be used to store a bit value that indicates the routing type. The various bit values for the routing types are shown as "C" bit (for continuation IOCB), "DR" (for a direct route IOCB) and "T" for trigger or task management IOCB. For example, a first queue status bit value 3'b000 indicates that routing type can be decoded by DMA logic 152. A second status value, for example, 3'b1xx indicates that a continuation IOCB is in process (i.e. the C bit is set). A second queue status value of 3'b01x indicates that a direct routing type is in progress, i.e. the DR bit is set. A third queue status value of 3'b001 indicates routing to a master engine, i.e. the T bit is set.

The engine identifier (shown as FCID) is indicated by 228B, while the count value 228C is used to track continuation IOCBs.

Figure 3A:
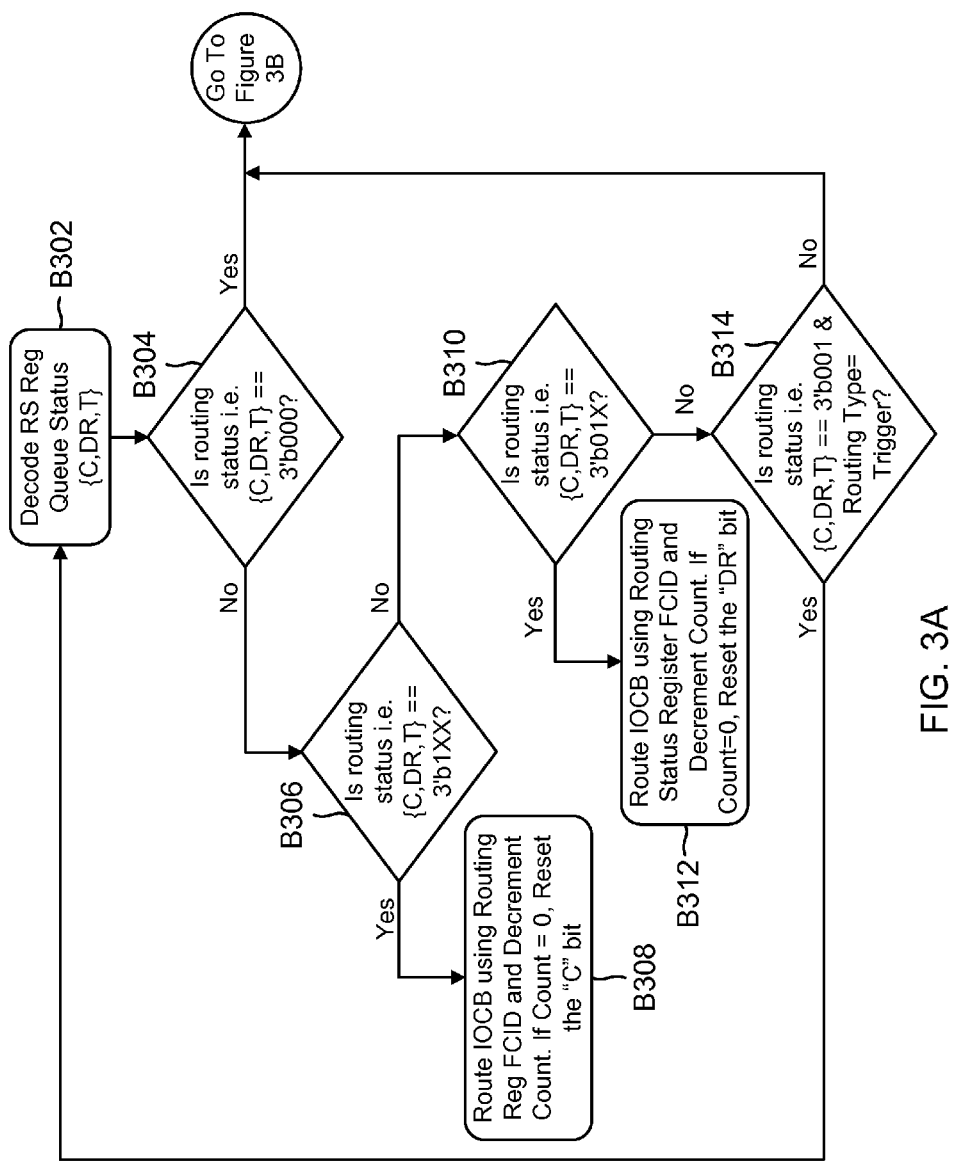
FIGS. 3A-3B show control block routing by a device, according to one aspect of the present disclosure.

Referring now to FIG. 3A, a process is shown with details of block B220 for selecting a routing type for an IOCB by request DMA logic 152, according to one aspect of the present disclosure. The process begins in block B302, when a queue status is decoded in block B302. As described above, queue status may be stored at the status register 228 or any other storage location. Request DMA logic 152 first determines if it can decode a status type, for example, if the status is set to a first value, for example, 3'b00. If yes, the process moves to FIG. 3B that is described below in detail.

If not, then in block B306, the process determines if the status is set to a second value, for example, 3'b1XX, i.e. if a continuation IOCB is in progress. If yes, then in block B308, the IOCB is routed using the engine identifier value 228B and count 228C is decreased. If not, then in block B310, the process determines if the routing status is set to a third value, for example, 3'b01X i.e. if a direct route is in process. If yes, then the DMA logic 152 uses FCID 228B to determine the identifier of the engine core and routes the IOCB to that engine core. The count 228C is also decreased. If the count is zero, then the "DR" bit is reset.

If in block B310, the routing status is not set to 3'b01X, then in block B314, the process determines if the status is set to a fourth value, for example, 3'b001 i.e. if routing to a master engine is in progress. If yes, then the process moves to block B302. If not, then the process moves to FIG. 3B, described below in detail.

Figure 3B:
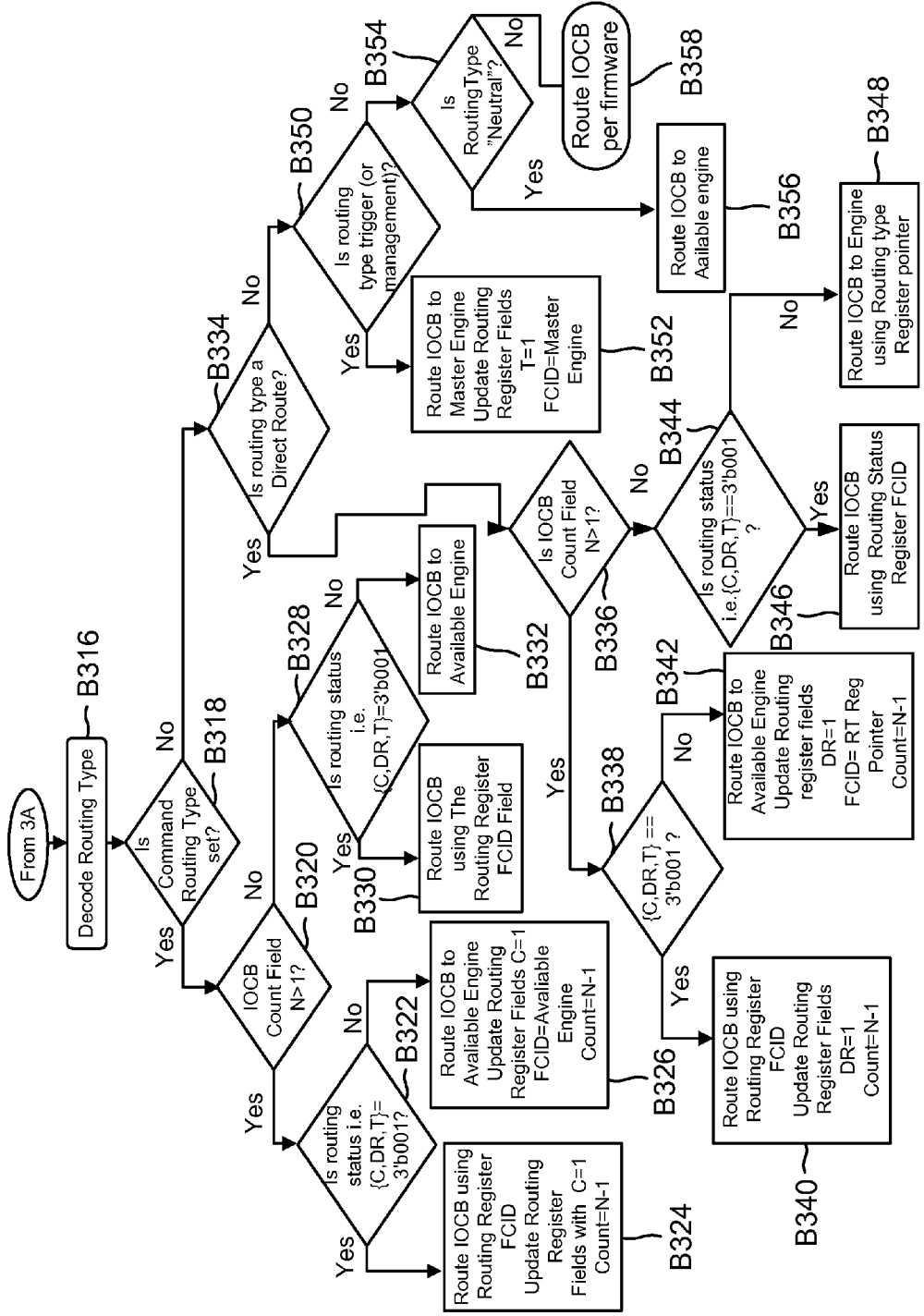

FIG. 3B shows a process for handling an IOCB when the DMA logic 152 and adapter 116 are initialized, according to one aspect of the present disclosure. The process begins in block B316, when the routing type is decoded by the DMA logic 152. The DMA logic 152 determines in block B318, if the IOCB involves a command type, described above in detail. If yes, then in block B320, the DMA logic 152 determines if the IOCB count field 230A is greater than 1. If yes, then in block B322, the DMA logic 152 determines if the queue status is set to the first value. If yes, then in block B324, the IOCB is routed based on FCID 228B. The C bit is set and the count field is changed to N−1. If not, then in block B326, the IOCB is routed to a first available engine. The C bit is set and the count is changed. The FCID value 228B is set to the engine to which the IOCB is routed. This allows subsequent continuation IOCBs for the same transfer to be routed to the same engine as the FCID.

Referring back to block B320, when the IOCB count field is not greater than 1, then in block B328, the DMA logic 152 determines if the routing status is set to 3'b001. If yes, then in block B330, the IOCB is routed to the master engine, for example, an engine with the lowest identifier value. If not, then in block B332, the IOCB is routed to the first available engine core.

Referring back to block B318, if the command routing type is not set, then in block B334, the DMA logic 152 determines if the routing type is for a direct route. If yes, then in block B336, the DMA logic 152 determines if the IOCB count field is greater than 1. If yes, then in block B338, the DMA logic 152 determines if the queue status value (e.g. 3'b001) is set. If yes, then in block B340, the IOCB is routed using a routing register FCID. The DR bit is set and the count is changed to N−1. If not, then in block B342, the IOCB is routed to a next available engine. The DR bit is set and a pointer is set for the current IOCB routing type register 226. The count value is also changed to N−1. As explained above, the engine identifier for a "direct route: is obtained from the first data structure at the routing register 226 using the entry type field of the IOCB. When the route type is a direct route, then the word offset and bit offset field are used to locate the engine identifier. The engine identifier is then loaded into register 226 as a pointer to the routing table.

Referring back to block B336, if the IOCB count field is not greater than 1, then in block B344, the DMA logic 152 determines if the routing queue status is set to 3'b001. If yes, then, in block B346, the IOCB is routed using an FCID 228B that is determines from the routing register 228. If not, then in block B348, the IOCB is routed to an engine using a routing type register pointer described above.

Referring back to block B334, if the routing type is not a direct routing type, then in block B350, the DMA logic 152 determines if the routing type is a trigger or management routing type. If yes, then in block B352, the IOCB is routed to the master engine core. The T bit is set and the FCID 228B in the status register 228 is set to the master engine. If not, then in block B354, the DMA logic 152 determines if the routing type is neutral. If yes, then the IOCB is routed to any available engine in block B356. If not, then in block B358, the IOCB is routed to the firmware as an error condition or further processing.

The various aspects described above have advantages. IOCBs are distributed based on a priority scheme that provides optimum load balancing among engines cores 120A-120D.

The above description presents the best mode contemplated for carrying out the present aspects, and of the manner and process of making and using them, in such full, clear, concise, and exact terms as to enable any person skilled in the art to which they pertain to make and use these aspects. These aspects are, however, susceptible to modifications and alternate constructions from that discussed above that are fully equivalent. For example, the aspects disclosed herein are applicable to any peripheral device and are not limited to any particular adapter type. Consequently, these aspects are not limited to the particular aspects disclosed. On the contrary, these aspects cover all modifications and alternate constructions coming within the spirit and scope of the aspects as generally expressed by the following claims, which particularly point out and distinctly claim the subject matter of the aspects.

What is claimed is:

1. A machine implemented method, comprising:
designating a hardware engine from among a plurality of hardware engines of an adapter coupled to a computing device as a master engine; wherein the plurality of hardware engines are adapted to process control blocks that are received from the computing device to read data from a storage device, write data to the storage device, obtain status for an input/output request and perform a management task associated with the adapter including obtaining a status of executing a command by the adapter, and aborting the command by the adapter; and wherein the management task is processed by the master engine;
receiving a plurality of control blocks from the computing device at the adapter;
evaluating a field of each control block by the adapter to determine a control block type from among a continuation control block for data transfer using more than one control block; a direct route control block for a specific hardware engine; a neutral control block routable to any available hardware engine; and a management task control block for the management task;
selecting a routing type for each control block based on the evaluation and by using a first data structure, wherein the first data structure stores an identifier for each of the plurality of hardware engines and an indicator for a command routing type for the continuation control block, an indicator for a direct routing type for the direct route control block, an indicator for a management routing type for the management task control block and an indicator for a neutral routing type for the neutral control block;
routing the continuation control block to a same hardware engine that processed a previous control block;
routing the neutral control block to any available hardware engine from among the plurality of hardware engines;
routing the direct route control block to the specific hardware engine;
routing the management task control block to the master hardware engine from among the plurality of hardware engines; and tracking a routing status of the plurality of control blocks by a second data structure, where the second data structure stores an indicator indicating a status for each routing type, hardware engine identifiers identifying hardware engines processing the control blocks and a count value for the continuation type control block.

2. The method of claim 1, wherein the adapter maintains the first data structure at a storage location accessible to the adapter.

3. The method of claim 1, wherein the adapter maintains the second data structure at a storage location accessible to the adapter.

4. The method of claim 1, wherein the direct route control block includes a field from which the specific hardware engine is identified.

5. The method of claim 2, wherein the first data structure tracks a control block count for the continuation control block.

6. The method of claim 1, wherein the plurality of control blocks are created by a driver executed by the computing device.

7. The method of claim 1, wherein a routing priority for any of the plurality of control blocks is established by the control block type.

8. A non-transitory, machine readable storage medium having stored thereon instructions for performing a method, comprising machine executable code which when executed by at least one machine, causes the machine to:
designate a hardware engine from among a plurality of hardware engines of an adapter coupled to a computing device as a master engine; wherein the plurality of hardware engines are adapted to process control blocks that are received from the computing device to read data from a storage device, write data to the storage device, obtain status for an input/output request and perform a management task associated with the adapter including obtaining a status of executing a command by the adapter, and aborting the command by the adapter; and wherein the management task is processed by the master engine;
receive a plurality of control blocks from the computing device at the adapter;
evaluate a field of each control block by the adapter to determine a control block type from among a continuation control block for data transfer using more than one control block; a direct route control block for a specific hardware engine; a neutral control block routable to any available hardware engine; and a management task control block for the management task;
select a routing type for each control block based on the evaluation and by using a first data structure, wherein the first data structure stores an identifier for each of the plurality of hardware engines and an indicator for a command routing type for the continuation control block, an indicator for a direct routing type for the direct route control block, an indicator for a management routing type for the management task control block and an indicator for a neutral routing type for the neutral control block;
route the continuation control block to a same hardware engine that processed a previous control block;
route the neutral control block to any available hardware engine from among the plurality of hardware engines;
route the direct route control block to the specific hardware engine;

and
route the management task control block to the master hardware engine from among the plurality of hardware engines; and track a routing status of the plurality of control blocks by a second data structure, where the second data structure stores an indicator indicating a status for each routing type, hardware engine identifiers identifying hardware engines processing the control blocks and a count value for the continuation type control block.

9. The storage medium of claim 8, wherein the adapter maintains the first data structure at a storage location accessible to the adapter.

10. The storage medium of claim 8, wherein the adapter maintains the second data structure at a storage location accessible to the adapter.

11. The storage medium of claim 8, wherein the direct route control block includes a field from which the specific hardware engine is identified.

12. The storage medium of claim 9, wherein the first data structure tracks a control block count for the continuation type control block.

13. The storage medium of claim 8, wherein the plurality of control blocks are created by a driver executed by the computing device.

14. The storage medium of claim 8, wherein a routing priority for any of the plurality of control blocks is established by the control block type.

15. A device for processing input/output requests coupled to a computing device, comprising:
a plurality of hardware engines for processing control blocks, where the control blocks are to read data, write data, obtain status for an input/output request and perform a management task; where one of the hardware engine is designated as a master engine to perform the management task including obtaining a status of executing a command by the device, and aborting the command by the device; and a direct memory access (DMA) request logic having hardware to execute instructions to:

receive a plurality of control blocks from the computing device;

evaluate a field of each control block to determine a control block type from among a continuation control block for data transfer using more than one control block; a direct route control block for a specific hardware engine; a neutral control block routable to any available hardware engine; and a management task control block for the management task;

select a routing type for each control block based on the evaluation and by using a first data structure, wherein the first data structure stores an identifier for each of the plurality of hardware engines and an indicator for a command routing type for the continuation control block, an indicator for a direct routing type for the direct route control block, an indicator for a management routing type for the management task control block and an indicator for a neutral routing type for the neutral control block;

route the continuation control block to a same hardware engine that processed a previous control block;

route the neutral control block to any available hardware engine from among the plurality of hardware engines;

route the direct route control block to the specific hardware engine;

route the management task control block to the master hardware engine from among the plurality of hardware engines; and track a routing status of the plurality of control blocks by a second data structure to, where the second data structure stores an indicator indicating a status for each routing type, hardware engine identifiers identifying hardware engines processing the control blocks and a count value for the continuation type control block.

16. The device claim 15, wherein the device maintains the first data structure at a storage location accessible to the device.

17. The device of claim 16, wherein the first data structure tracks a control block count for the continuation type control block.

18. The device of claim 15, wherein the device maintains the second data structure at a storage location accessible to the device.

19. The device of claim 15, wherein the direct route control block includes a field from which the specific hardware engine is identified.

20. The device of claim 15, wherein the plurality of control blocks are created by a driver executed by the computing device.

21. The device of claim 15, wherein a routing priority for any of the plurality of control blocks is established by the control block type.

* * * * *